(12) United States Patent
He et al.

(10) Patent No.: US 10,464,208 B2
(45) Date of Patent: Nov. 5, 2019

(54) COMPUTER-IMPLEMENTED METHOD FOR SETTING DEVICE IDENTIFICATION, MAIN CONTROL CIRCUIT, AND ROBOT

(71) Applicant: UBTECH Robotics Corp., Shenzhen (CN)

(72) Inventors: Wei He, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 27 days.

(21) Appl. No.: 15/458,976

(22) Filed: Mar. 15, 2017

(65) Prior Publication Data
US 2018/0126549 A1  May 10, 2018

(30) Foreign Application Priority Data
Nov. 7, 2016   (CN) ............................ 2016 1 0987748

(51) Int. Cl.
*B25J 9/16* (2006.01)

(52) U.S. Cl.
CPC ................ *B25J 9/16* (2013.01); *B25J 9/161* (2013.01); *G05B 2219/33105* (2013.01); *G05B 2219/33126* (2013.01)

(58) Field of Classification Search
CPC ... B25J 9/16; B25J 9/161; G05B 2219/33105; G05B 2219/33126
See application file for complete search history.

(56) References Cited

U.S. PATENT DOCUMENTS

| | | | |
|---|---|---|---|
| 2009/0128080 A1* | 5/2009 | Cheng | G05B 19/0423 318/625 |
| 2009/0240859 A1* | 9/2009 | Hsieh | G05B 19/414 710/110 |
| 2017/0080568 A1* | 3/2017 | Yu | H02P 5/68 |

OTHER PUBLICATIONS

Sun Hui; Discussion on Key Technology and Application of Integrated Mutual Preparation System of East China Power Dispatch and State Power Dispatch; Power System and Clean Energy, vol. 31, No. 8, pp. 26-30, Aug. 25, 2015, China Academic Journal Electronic Publishing House.

* cited by examiner

*Primary Examiner* — Robert T Nguyen

(57) ABSTRACT

A computer-implemented method for setting device identification includes: a main control circuit sending a first identification to a first device coupled to the main control circuit to set the first identification on the first device. The main control circuit sends a second identification to a second device coupled to the main control circuit to set the second identification on the second device. The first identification is different from the second identification when the kind of the first device is the same as that of the second device, and the first identification is the same as or different from the second identification when the kind of the first device is different from that of the second device. A main control circuit and a robot for performing the setting method are also provided.

14 Claims, 7 Drawing Sheets setting a first identification on a first device coupled to a main control circuit of a robot by sending the first identification to the first device from the main control circuit — S101 setting a second identification on a second device coupled to the main circuit by sending the second identification to the second device from the main control circuit — S102

US 10,464,208 B2

COMPUTER-IMPLEMENTED METHOD FOR SETTING DEVICE IDENTIFICATION, MAIN CONTROL CIRCUIT, AND ROBOT

CROSS REFERENCE TO RELATED APPLICATIONS

This application claims priority to Chinese Patent Application No. 201610987748.4, filed Nov. 7, 2016, which is hereby incorporated by reference herein in its entirety.

BACKGROUND

1. Technical Field

The present disclosure relates to robotics, and particularly to a computer-implemented method for setting device identification, a main control circuit and a robot.

2. Description of Related Art

Currently, robots are currently more and more frequently applied in our daily lives and entertainment. A robot generally includes a main control circuit and several devices. The robot accomplishes joint movement by controlling each device through the main control circuit. The several devices refer to servos, sensors, and so on.

The main control circuit generally distinguishes different devices according to the device identification, (that is, ID), and sends each command to the different devices. The problem of duplicate identification values for devices will affect normal work of the robot. In the present robotics, IDs can be set on the different devices one by one before devices are used. During the using process, the devices with the same ID need to be dismantled by hand, and are set with new IDs separately, and then the devices with the new IDs are installed again. It is tedious, time consuming, and error-prone.

SUMMARY

A computer-implemented method for setting device identification includes: a main control circuit setting a first identification on a first device coupled to a main control circuit of a robot by sending the first identification to the first device from the main control circuit; and setting a second identification on a second device coupled to the main control circuit by sending the second identification to the second device from the main control circuit; wherein the first identification is different from the second identification when the kind of the first device is the same as that of the second device, and the first identification is the same as or different from the second identification when the kind of the first device is different from that of the second device.

Other objects, advantages and novel features of the invention will become more apparent from the following detailed description when taken in conjunction with the accompanying drawings.

BRIEF DESCRIPTION OP THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
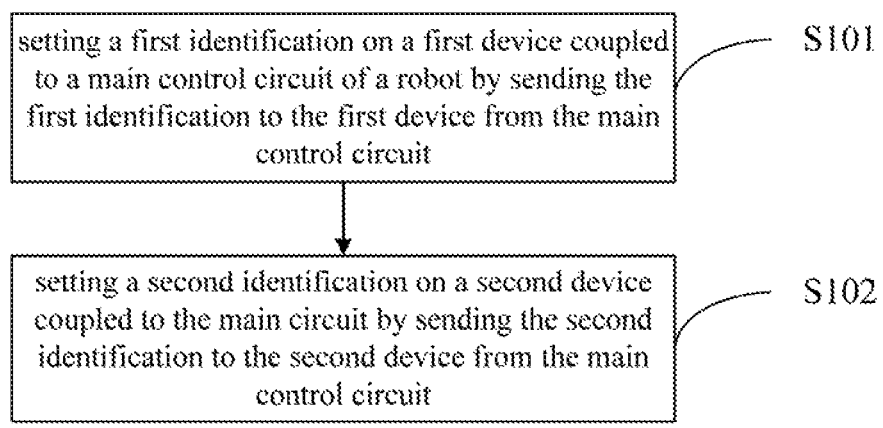
FIG. 1 is a flowchart of a first embodiment of a computer-implemented method for setting device identification in accordance with the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Embodiment 1

Referring to FIG. 1, a flowchart of a first embodiment of a computer-implemented method for setting device identification in accordance with the present disclosure. As shown in FIG. 1, in the present embodiment, the method for setting device identification includes the following steps.

In step S101, setting a first identification on a first device coupled to a main control circuit of a robot by sending the first identification to the first device from the main control circuit.

In step S102, setting a second identification on a second device coupled to the main circuit by sending the second identification to the second device from the main control circuit.

The order of execution of steps S101 and S102 is essentially arbitrary. When the kind of the first device is the same as that of the second device, the first identification is different from the second identification. When the kind of the first device is different from that of the second device, the first identification is the same as or different from the second identification.

Specifically, the device identification is an identification information used for distinguishing different devices, such as device ID or other information for distinguishing different devices. The main control circuit sends commands to a specified device according to the device identification to control the operation or communication of the specified device. The first device or the second device coupled to the main control circuit can be a servo or a sensor such as infrared sensor, ultrasonic sensor and so on.

In one embodiment, at least one communication interface is arranged on the main control circuit. The first device is connected to the main control circuit by a first communication interface. The second device is connected to the main control circuit by a second communication interface. The main control circuit sends the first identification to the first device through the first communication interface and sends the second identification to the second device through the second communication interface. The first identification is different from the second identification when the kind of the first device is the same as that of the second device, for instance, the first identification is 0x01 and the second identification is 0x02 when both the first device and the second device are servos. The first identification is the same as the second identification when the kind of the first device is different from that of the second device, for instance, both the first identification and the second identification are 0x01 when the first device is an infrared sensor and the second device is a servo. In another embodiment, when the kind of the first device is different from that of the second device, the first identification is different from the second identification, for instance, the first identification is 0x01, and the second identification is 0x02. The first device and second device are cascaded and coupled to one communication interface of the main control circuit. The main control circuit sends the second identification to the second device through the first device or sends the first identification to the first device through the second device.

Optionally, before step S101, the method for setting device identification further includes the following steps.

In step S1001, reading type information of the first device and the second device.

Specifically, in one embodiment, the type information include an angular value of robotic device used for distinguishing different kinds of devices. When the robotic device is a servo, reading an angular value of an output shaft of the servo in real time as the type information. The angular value is in the range of 0 degrees to 360 degrees and recorded by an angular sensor inside the servo. When the robotic device is a sensor other than the servo, the angular value is set in the sensor beforehand. The sensor receives a reading command of reading the type information from the main control circuit and returns the angular value presented in the sensor. The devices of the same kind have the same angular value, or the angular values of the devices of the same kind are within the same range of values, for instance, all the angular values of the devices of the same kind are 500 degrees, or less than or equal to 360 degrees. Different kinds of devices have different angular values, or the angular values of the different kinds of devices are not within the same range of values. For instance, the angular value of the first device is 500 degrees, and the angular value of the second device is 300 degrees. In another embodiment, the type information is other information capable of distinguishing different kinds of devices.

In step S1002, acquiring the kind of the first device and the kind of the second device according to the type information.

In the present embodiment, each kind of device corresponding to different angular values or different ranges of angular values of the robotic device are saved in the main control circuit, for instance, the kind of device corresponding to an angular value less than or equal to 360 degrees is servo, the kind of device corresponding to an angular value equal to 500 degrees is infrared sensor, and the kind of device corresponding to an angular value equal to 600 degrees is ultrasonic sensor. If the angular value of the first device is 500 degrees read by the main control circuit, determining that the kind of the first device is infrared sensor. If the angular value of the second device is 300 degrees (that is less than 360 degrees) read by the main control circuit, determining that the kind of the second device is servo. In another embodiment, according to practical experience, each angular value or each range of angular values of the robotic device can also be corresponded to other kinds of devices, which is not specifically limited.

In the present embodiment, the main control circuit is only coupled to the first device and the second device. In another embodiment, the main control circuit includes at least two communication interfaces, and each communication interface can be coupled to multiple devices connected in sequence.

In the present embodiment, the main control circuit reads type information of device, acquires kind of device according to the type information, sends different device identifications to the devices of the same kind to set the different device identification on the devices of the same kind, and sends the same device identification or different device identifications to the different kinds of devices. Accordingly, the main control circuit can distinguish different devices according to the device identification, specifies a device and communicates with the device specified to achieve the device identification setting automatically and the device identification reuse when the same device identification is set on the different kinds of devices.

Figure 2:
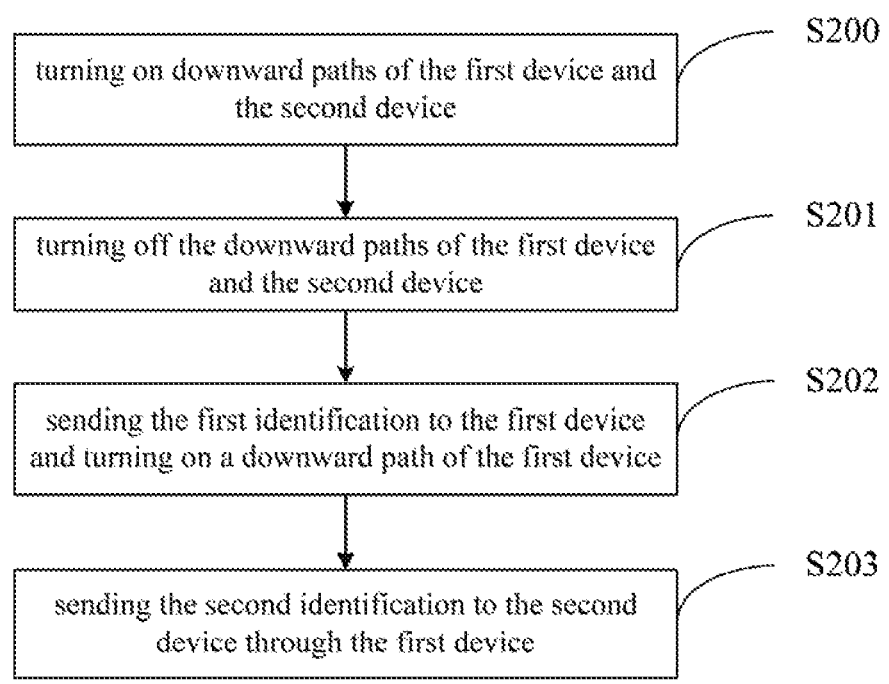
FIG. 2 is a flowchart of a second embodiment of a computer-implemented method for setting device identification in accordance with the present disclosure.

Referring to FIG. 2, a flowchart of a second embodiment of a commuter-implemented method for setting device identification in accordance with the present disclosure. As shown in FIG. 2, in the second embodiment, a main control circuit, a first device and a second device are coupled in sequence. In the present embodiment, the method for setting device identification includes the following steps.

In step S200, turning on downward paths of the first device and the second device.

Specifically, in one embodiment, identification 0xFF is presented on every devices coupled to the main control circuit. 0xFF indicates turning off the downward path of the device. Before the device identification of a device is set to 0xFF, the device can communicate with the main control circuit or the previous device coupled to the device. After the device identification of the device is set to 0xFF, the downward path of the device is turned off, such that the next device can not communicate with the device and can not communicate with the main control circuit through the device. When the device identifications of the first device and the second device are set to other identification except 0xFF, the downward paths of the first device and the second device are turn on, and the main control circuit can communicate with the first device and the second device coupled to the first device. In another embodiment, the identification indicating turning off the downward path can be other identification except 0xFF.

Optionally, step S200 further includes following steps.

In step S2001, broadcasting a first command indicating turning on the downward paths to all the devices, wherein the first command is different from the first identification and the second identification.

In the present embodiment, the main control circuit broadcasts the first command, that is, setting the device identifications of ail the devices to 0xFE. The device identifications of all the devices set by the first command are different from the first identification and the second identification, for instance, the device identifications of all the devices set by the first command are 0xFE, the first identification is 0x01, and the second identification is 0x02. When the device identifications of all the devices are 0xFE, the downward paths of all the devices are turned on, and the main control circuit can communicate with all the devices. In another embodiment, the first command may set the device identifications of all the devices to other identification except 0xFE.

In step S2002, determining whether the downward paths of the first device and the second device are turned on; if not, returning to step S2001.

Specifically, the main control circuit sends a reading command, that is, reading angular values of the devices with device identification 0xFF and determines whether any device returns angular value. When any device returns angular value, determining that the downward path of the first device or the second device is not turned on, and returning to step S2001 until no angular value is returned. When no angular value is returned, determining that the device identifications of all the devices are 0xFE.

In step S201, turning off the downward paths of the first device and the second device.

Specifically, the main control circuit sets the device identifications of the first device and the second device to 0xFF. At this point, the downward paths of the first device and the second device are turned off.

Optionally, step S201 may include following steps.

In step S2011, the main control circuit broadcasts a second command indicating turning off downward paths in all the devices, wherein the second command is different from the first identification and the second identification.

Specifically, the main control circuit broadcasts the second command. The second command sets the device identifications of all the devices with device identification 0xFE to 0xFF. The second command is different from the first identification and the second identification, that is, the device identifications of all the devices set by the second command are different from the first identification and the second identification. For instance, the device identifications of all the devices set by the second command are 0xFF, the first identification is 0x01, and the second identification is 0x02. The downward path of the device with device identification 0xFF is turned off when the device identification of the device is 0xFF, that is, the signal output path of the device with 0xFF is in a disconnected state. The next device coupled to the device with 0xFF can not communicate with the device with 0xFF, for instance, when the device identification of the first device is 0xFF, the second device coupled to the first device can not communicate with the first device and thus can not communicate with the main control circuit through the first device.

In step S2012, determining whether a downward path of the first device is turned off, when the downward path of the first device is not turned off, returning to step S2011.

Specifically, the main control circuit sends a reading command and determines whether any device returns angular value. The reading command indicates reading angular values of devices with device identification 0xFE. When any device returns angular value, determining that the downward path of the first device is not turned off and returning to step S2011 until no angular value is returned.

In step S202, sending the first identification to the first device and turning on a downward path of the first device.

Specifically, the main control circuit sends a changing command to the first device, that is, changing the device identification of the first device from 0xFF to the first identification (e.g. 0x01). When the device identification of the first device is not 0xFF, determining that the signal output path of the first device is turned on.

Optionally, after step S202 further including following steps.

In step S2021, the main control circuit determines whether a downward path of the second device is turned off.

In step S2022, the main control circuit broadcasts the second command indicating turning off downward paths to all the devices when the down ward path of the second device is not turned off.

The processes of step S2021 and S2022 are similar to that of step S2012. Due to steps S2021 and S2022, it is avoided that the second device can not receive the second command broadcasted by the main control circuit after the downward path of the first device is turned off and result in setting device identification failed.

In step S203, sending the second identification to the second device through the first device.

Specifically, the changing command indicates changing the device identification of device with its downward path turned off to the second identification (e.g. 0x02). The main control circuit sends the changing command to the first device to make the first device send the second identification to the second device cascaded to the first device and make the second device change the device identification of the second device from 0xFF to the second identification (e.g. 0x02). Equally, the first identification is different from the second identification when the kind of the first device is the same as that of the second device, and the first identification is the same as or different from the second identification when the kind of the first device is different from that of the second device.

In the present embodiment, the main control circuit turns on the downward paths of the first device and the second device cascaded to the first device. Even if the device identifications of the first device and the second device are not 0xFF indicating turning off the downward path. Accordingly, it is avoided that the second device can not receive the command from the main control circuit and result in setting device identification failed when the downward path of the first device is turned off.

In the present embodiment, the main control circuit is coupled to the first device and the second device cascaded to the first device. In another embodiment, the main control circuit can be coupled to three or more devices.

The steps in the second embodiment are performed before step S1001 in the first embodiment. The second embodiment can be combined with the first embodiment.

Figure 3:
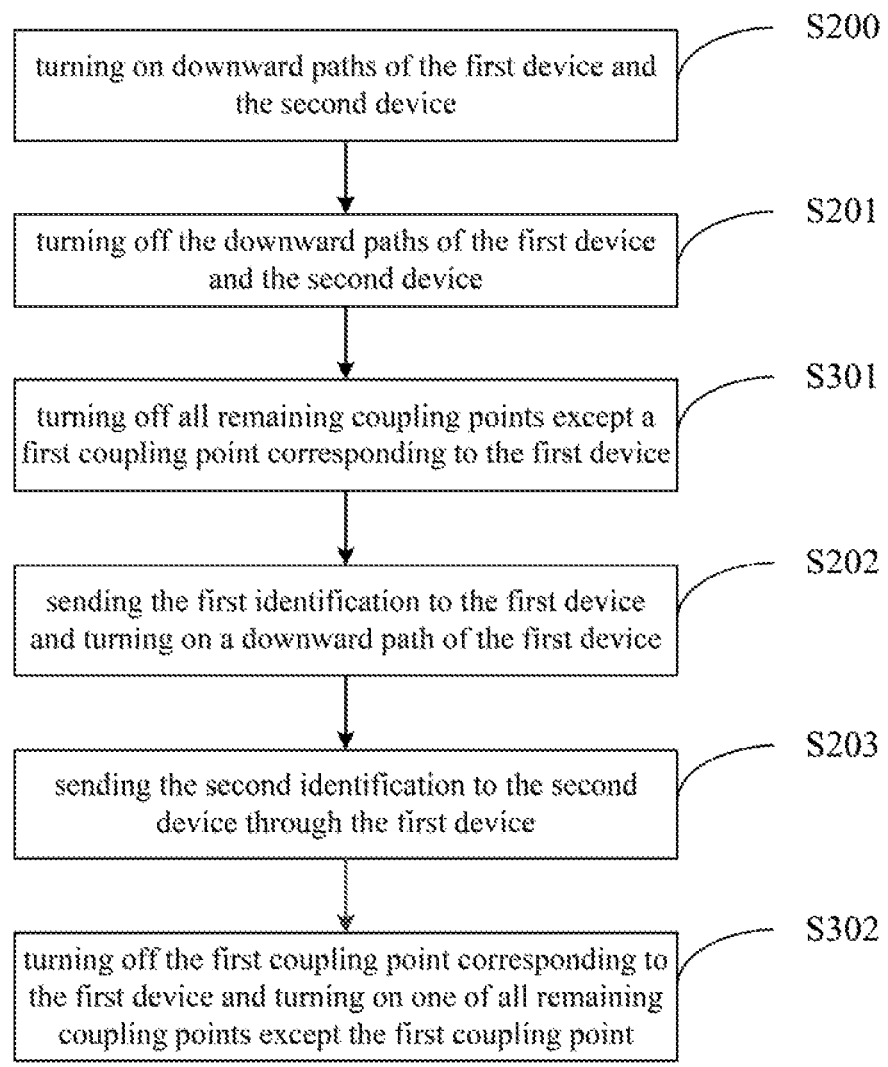
FIG. 3 is a flowchart of a third embodiment of a computer-implemented method for setting device identification in accordance with the present disclosure.

Referring to FIG. 3, a flowchart of a third embodiment of a computer-implemented method for setting device identification in accordance with the present disclosure. As shown in FIG. 3, the third embodiment is based on the second embodiment, and the main control circuit includes at least two coupling points used for connecting at least two external connection devices in the third embodiment. Unlike the second embodiment, before step S202, further including following step.

In step S301, turning off all remaining coupling points except a first coupling point corresponding to the first device.

Specifically, the main control circuit can turn on and turn off one or more coupling points by the control unit or switch circuit inside the main control circuit. In the present embodiment, the main control circuit only turns on the first coupling point corresponding to the first device to set the device identifications of the first device and other devices cascaded to the first device.

After step S203, further including following step.

In step S302, turning off the first coupling point corresponding to the first device and turning on one of all remaining coupling points except the first coupling point.

Specifically, after the main control circuit successfully sets the device identifications of the first device and other devices cascaded to the first device, the main control circuit turns off the first coupling point corresponding to the first device, selects and turns on one of all remaining coupling points to make the main control circuit can set the device identifications of the external connection devices corresponding to the coupling point turned on until all the device identifications of all the devices connected to all remaining coupling points are successfully set. When the number of the coupling points arranged on the main control circuit is greater than or equal to three, repeating above steps until all the device identifications of all the devices connected to the main control circuit have been successfully set.

For instance, the main control circuit includes a first coupling point 20, a second coupling point 21 and a third coupling point 22, wherein the first coupling point 20 is corresponds to the first device. The main control circuit sends a reading command to the first coupling point 20. The reading command indicates reading angular values of the devices with device identification 0xFF (that is, the identification for turning off downward path). If the main control circuit does not receive any angular value from the device, determining that the device identifications of all the devices connected to the first coupling point 20 have been successfully set. Then the main control circuit turns off the first coupling point 20, turns on the second coupling point 21, and sets the device identifications of the external connection devices until all the device identifications of all the devices connected to the second coupling point 21 have been successfully set. Then the main control circuit turns off the second coupling point 21, turns on the third coupling point 22, and sets the device identifications of the external connection devices.

The third embodiment can be combined with the first embodiment and the second embodiment.

Figure 4:
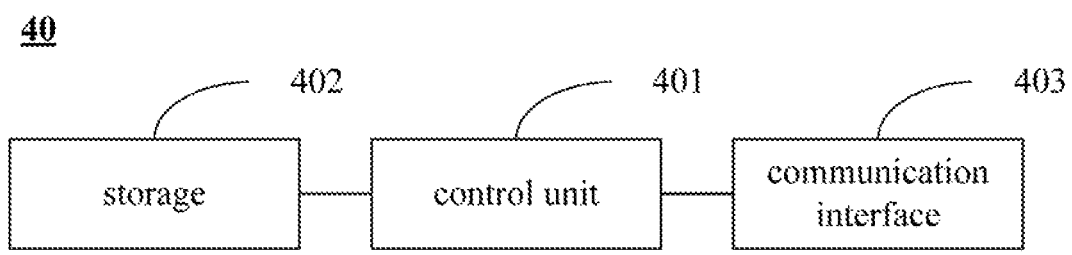
FIG. 4 is a schematic drawing of a main control circuit in accordance with the present disclosure.

Referring to FIG. 4, a schematic drawing of a main control circuit in accordance with the present disclosure. As shown in FIG. 4, the main control circuit 40 includes a control unit 401, a storage 402 and a communication interface 403.

The storage 402 and the communication interface 403 are coupled to the control unit 401 respectively. The storage 402 saves a first identification and a second identification. The communication interface 403 connects to at least a first device and a second device.

The control unit 401 sets the first identification on the first device by sending the first identification to the first device. The control unit 401 sets the second identification on the second device by sending the second identification to the second device. When the kind of the first device is the same as that of the second, the first identification is different from the second identification. When the kind of the first device is different from that of the second device, the first identification is the same as or different from the second identification.

Specifically, in one embodiment, the storage 402 saves the first identification, the second identification and the correspondence between angle values of the robotic device and kinds of devices. The communication interface 403 is connected to the input end of the first device through the bus. The output end of the first device is connected to the input end of the second device through the bus.

In the present embodiment, the control unit 401 broadcasts a first command indicating turning on downward paths to all the devices through the communication interface 403. Specifically, the first command indicates setting the device identifications of all the devices to 0xFE. Accordingly, it is avoid that the subsequent device identification setting step is affected when the initial value of the device identification is 0xFF (that is, the identification indicating turning off the downward path). At this point, both the device identification of the first device and the device identification of the second device are 0xFE. Then the control unit 401 broadcasts a second command indicating turning off downward paths to all the devices through the communication interface 403 to make the devices identifications can be set one by one. Specifically, the second command indicates setting the device identifications of all the devices with device identification 0xFE to 0xFF. At this point, the device identification of the first device is 0xFF, and the signal output path of the first device is turned off, so the second device can not communicate with the first device. Then the control unit 401 reads the angular value of the device with device identification 0xFF through the communication interface 403, that is, reading the angular value of the first device. The control unit 401 determines the kind of the device according to the angular value and sends a changing command to the first device. The changing command indicates changing the device identification of the first device from 0xFF to the first identification (e.g. 0x01). The changed device identification of the first device is the first identification. At this point, the signal output path of the first device is turned on, so the second device can communicate with the first device. The control unit 401 determines whether the device identification of the second device is 0xFE. When the device identification of the second device is 0xFE, the main control circuit broadcasts the second command indicating turning off downward paths to all the devices until the device identification of the second device was changed to 0xFF to avoid that the next devices coupled to the second device receive the device identification changing command sent by the control unit 401. The control unit 401 reads the angular value of the device with device identification 0xFF through the communication interface 403, that is, reading the angular value of the second device. The control unit 401 determines the kind of the device according to the angular value and sends a changing command to the second device when the kind of the first device is the same as that of the second device. The changing command indicates changing the device identification from 0xFF to the second identification (e.g. 0x02). The second identification is different from the first identification.

Figure 5:
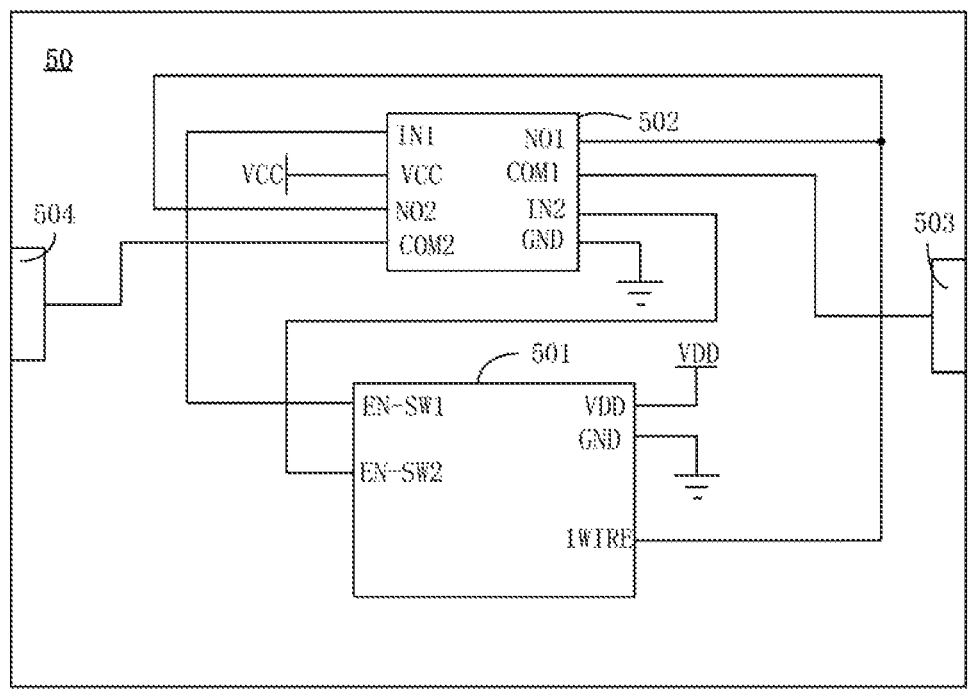
FIG. 5 is a schematic drawing of a circuit inside a first device or a second device coupled to the main control circuit in accordance with the present disclosure.

Referring to FIG. 5, a schematic drawing of a circuit inside a first device or a second device coupled to the main control circuit in accordance with the present disclosure. As shown in FIG. 5, a control chip 501, a switch chip 502, a first communication interface 503 and a second communication interface 504 are set up inside the first device or the second device 50.

The control chip 501 is provided with at least a power pin VDD, a ground pin GND, a signal output pin 1WIRE, a first enable pin EN-SW1 and a second enable pin EN-SW2. The switch chip 502 is provided with a first signal input pin NO1, a first enable pin IN1, a first output pin COM1, a second signal input pin NO2, a second enable pin IN2, a second output pin COM2, a power pin VCC and a ground pin GND.

The signal output pin 1WIRE of the control chip 501 is coupled to the first signal input pin NO1 and the second signal input pin NO2 of the switch chip 502. The first enable pin EN-SW1 of the control chip 501 is coupled to the first enable pin IN1 of the switch chip 502. The second enable pin EN-SW2 of the control chip 501 is coupled to the second enable pin IN2 of the switch chip 502. The first output pin COM1 of the switch chip 502 is coupled to the first communication interface 503. The second output pin COM2 of the switch chip 502 is coupled to the second communication interface 504.

After the device is powered on, the control chip 501 detects electrical level of the first output pin COM1 and electrical level of the second output pin COM2 to determine which one of the first communication interface 503 and the second communication interface 504 is input end. If the first output pin COM1 is high level, determining that the first communication interface 503 is input end and the second communication interface 504 is output end. If the second output pin COM2 is high level, determining that the second communication interface 504 is input end and the first communication interface 503 is output end.

The control chip 501 controls the first enable pin IN1 and the second enable pin IN2 respectively by controlling the first enable pin EN-SW1 and the second enable pin EN-SW2, and controls on-off of the first signal input pin NO1, the first output pin COM1, the second signal input pin NO2, and the second output pin COM2 of the switch chip 502, respectively.

Specifically, In one embodiment, the first communication interface 503 is input end, and the second communication interface 504 is output end. When the first device or the second device 50 receives the second command indicating turning off downward paths of all the device broadcasted by the main control circuit 40, the control chip 501 only enables pin EN-SW1, joins COM1 and NO1, and disconnects COM2 and NO2. At this point, the output end 504 of the first device or the second device 50 is turned off to avoid that the device coupled to the output end 504 receives the command. Then after receiving the first identification or the second identification sent by the main control circuit 40 and setting the device identification of the first device or the second device 50 to the first identification or the second identification, the control chip 501 enables pin EN-SW2, joins COM2 and NO2. At this point, the output end 504 of the first device or the second device 50 is turned on, so the next devices coupled to the first device or the second device 50 can communication with the first device or the second device 50.

In the present embodiment, the main control circuit reads type information of device one by one by controlling on-off of downward path of each external connection device, acquires kind of device according to the type information, sends different device identifications to the devices of the same kind to set the different device identification on the devices of the same kind, and sends the same device identification or different device identifications to the different kinds of devices. Accordingly, the main control circuit can distinguish different devices according to the device identification, specify a device and communicate with the device specified to achieve the device identification setting automatically and the device identification reuse when the same device identification is set on the different kinds of devices.

In the present embodiment, only one communication interface is arranged on the main control circuit. In another embodiment, the main control circuit includes at least two communication interfaces.

Figure 6:
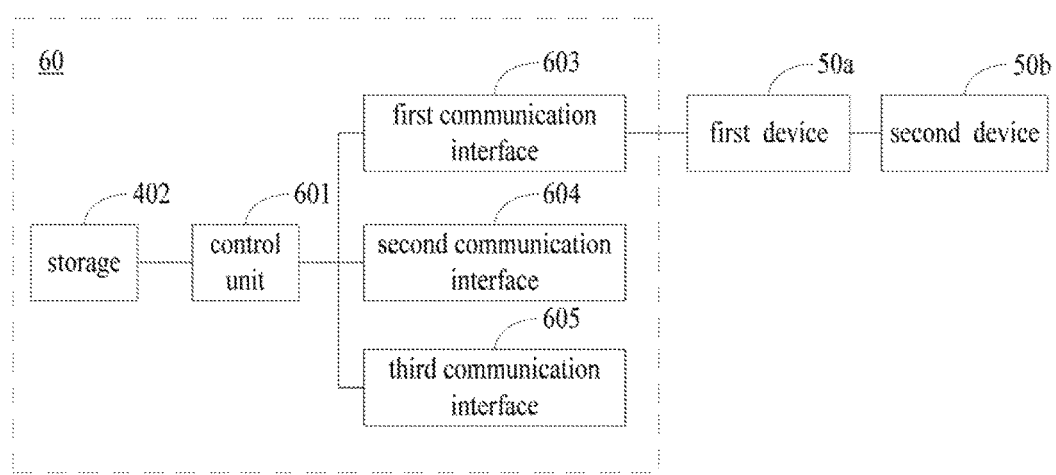
FIG. 6 is a schematic drawing of another embodiment of the main control circuit in accordance with the present disclosure.

Referring to FIG. 6, a schematic drawing of another embodiment of the main control circuit in accordance with the present disclosure. The structure of the main control circuit in FIG. 6 is similar as that of the main control circuit in FIG. 4. Unlike FIG. 4, in the sixth embodiment, the main control circuit 60 includes a first communication interface 603, a second communication interface 604 and a third communication interface 605. The first device 50a is coupled to the first communication interface 603, and the second device 50b is cascaded to the first device 50a.

The control unit 601 turns off all remaining communication interfaces except the first communication interface 603 corresponding to the first device 50a, that it, only the first communication interface 603 is turned on, and the second communication interface 604 and the third communication interface are turned off. Then the control unit 601 sets the device identifications of the first device 50a and the second device 50b. Please refer to the first embodiment for more on how to set the device identifications. After the main control circuit 60 successfully sets the device identifications of the first device 50a and the second device 50b, the control unit 601 turns off the first communication interface 603, and turns on one of all remaining communication interfaces (e.g. the second communication interface 604) and sets the device identifications of the external connection devices.

In the present embodiment, the main control circuit includes three communication interfaces. In another embodiment, the main control circuit includes more than three communication interfaces.

In the present embodiment, the main control circuit turns on only one communication interface at a time and sets the device identification of external connection device coupled to each communication interface one by one to avoid that the devices with different interfaces of the same kind receive the same device identification setting command because multiple interfaces are turned on. Accordingly, the duplication of device identification is avoided.

Figure 7:
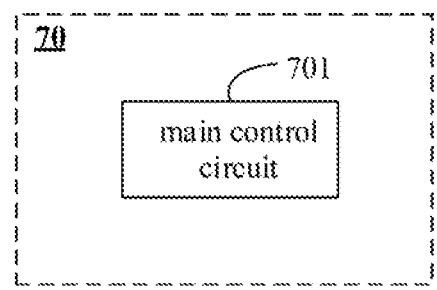
FIG. 7 is a schematic drawing of a robot in accordance with the present disclosure.

Referring to FIG. 7, a schematic drawing of a robot in accordance with the present disclosure. The robot 70 includes a main control circuit 701. The main control circuit 701 follows the same structure as the main control circuit of above embodiments.

In the present embodiment, the robot sets the first identification on the first device by sending the first identification to the first device and sets the second identification on the second device by sending the second identification to the second device through the main control circuit. The first device and the second device are coupled to the robot. The first identification is different from the second identification when the kind of the first device is the same as that of the second device, and the first identification is the same as or different from the second identification when the kind of the first device is different from that of the second device. Accordingly, the device identifications of the devices coupled to the robot can be set without repetition automatically, and the device identifications setting can be achieved without removing device.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A computer-implemented method for setting device identification, comprising:
providing a robot comprising a main control circuit, a first device, and a second device, the main control circuit electronically coupled to the first device and the second device;
reading, by the main control circuit, a type of the first device;
sending a first identification to the first device;

setting the first device to have the first identification;
reading, by the main control circuit, a type of the second device;
determining whether the type of the first device is the same as the type of the second device;
sending a second identification different from the first identification to the second device, in response to the type of the first device being the same as the type of the second device;
sending a second identification same as or different from the first identification to the second device, in response to the type of the first device being different from the type of the second device: and
setting the second device to have the second identification.

2. The method of claim 1, wherein the step of reading, the main control circuit, the type of the first device comprises:
reading a type information of the first device by the main control circuit; and
determining the type of the first device according to the type information of the first device;
wherein the step, of reading, by the main control circuit, the type of the second device comprising:
reading a type information of the second device by the main control circuit; and
determining the type of the second device according to the type information of the second device.

3. The method of claim 2, wherein the type information comprise angular values of the first device and the second device.

4. The method of claim 1, wherein the main control circuit, the first device and the second device are electronically coupled in sequence;
wherein the step of sending the second identification to the second device comprises:
sending the second identification to the first device; and
sending the second identification, through the first device, to the second device electronically cascaded to the first device.

5. The method of claim 4, before the step of sending the first identification to the first device, the method further comprising:
turning off downward paths of the first device and the second device, wherein the downward paths comprise a first communication pathway of the first device and a second communication pathway of the second device, the first communication pathway is configured for communication between the first device and the second device electronically cascaded to the first device, the second communication pathway is configured for communication between the second device and a next device electronically cascaded to the second device;
wherein the steps of sending the first identification to the first device, sending the second identification to the first device, and sending the second identification, through the first device, to the second device electronically cascaded to the first device comprise:
sending the first identification to the first device and turning on the first communication pathway; and
sending the second identification, through the first device and the first communication pathway, to the second device electronically cascaded to the first device.

6. The method of claim 5, before the step of turning off the downward paths of the first device and the second device, the method further comprising:
turning on the first communication pathway and the second communication pathway.

7. The method of claim 6, wherein the step of turning on the first communication pathway and the second communication pathway comprises:
broadcasting a first command indicating turning on the downward paths to all the devices, wherein the first command is different from the first identification and the second identification;
determining whether the first communication pathway and the second communication pathway are turned on; and
returning to the step of broadcasting the first command indicating turning on the downward paths to all the devices, in response to the first communication pathway and the second communication pathway are not turned on.

8. The method of claim 7, wherein the step of determining whether the first communication pathway and the second communication pathway are turned on comprises:
sending a reading command of reading angular values of devices with device identification corresponding to the first command;
determining whether any device returns angular value; and
determining that the first communication pathway or the second communication pathway is not turned on when any device returns angular value.

9. The method of claim 7, wherein the step of turning off downward paths of the first device and the second device comprises:
broadcasting a second command indicating turning off downward paths to all the devices by the main control circuit, wherein the second command is different from the first identification and the second identification;
determining whether the first communication pathway is turned off;
returning to step of broadcasting the second command indicating turning off downward paths to all the devices, in response to the first communication pathway being not turned off.

10. The method of claim 9, wherein the step of determining whether the first communication pathway is turned off comprises:
sending a reading command of reading angular values of devices with device identification corresponding to the second command;
determining whether any device returns angular value; and
determining that the first communication pathway is not turned off when any device returns angular value.

11. The method of claim 1,
wherein the main control circuit comprises at least two coupling points used for connecting at least two external connection devices;
wherein before the step of sending the first identification to the first device or the step of sending the second identification to the second device, further comprises:
turning off all remaining coupling points except a first coupling point corresponding to the first device;
wherein after the steps of sending the first identification to the first device and sending the second identification to the second device, further comprises:
turning off the first coupling point corresponding to the first device and turning on one of all remaining coupling points.

12. The method of claim 1, wherein the first device is a servo when the second device is a sensor, or the first device is the sensor when the second device is the servo, or both the first device and the second device are sensors, or both the first device and the second device are servos.

13. A main control circuit, comprising: a control unit, a storage and a communication interface;

the storage and the communication interface are electronically coupled to the control unit respectively, the storage is configured to save a first identification and a second identification, and the communication interface is electronically connected to at least a first device and a second device;

wherein the control unit is configured to:

read a type of the first device, send the first identification to the first device, set the first device to have the first identification, read a type of the second device, determine whether the type of the first device is the same as the type of the second device, send the second identification different from the first identification to the second device in response to the type of the first device being the same as the type of the second device, send the second identification same as or different from the first identification to the second device in response to the type of the first device being different from the type of the second device; and set the second device to have the second identification.

14. A robot, comprising a main control circuit, the main control circuit comprising: a control unit, a storage and a communication interface;

wherein the storage and the communication interface are electronically coupled to the control unit respectively, the storage is configured to save a first identification and a second identification, and the communication interface is electronically connected to at least a first device and a second device;

wherein the control unit is configured to:

read a type of the first device, send the first identification to the first device, set the first device to have the first identification, read a type of the second device, determine whether the type of the first device is the same as the type of the second device, send the second identification different from the first identification to the second device in response to the type of the first device being the same as the type of the second device, send the second identification same as or different from the first identification to the second device in response to the type of the first device being different from the type of the second device; and set the second device to have the second identification.

* * * * *